(12) United States Patent
Stoll et al.

(10) Patent No.: US 8,947,266 B2
(45) Date of Patent: Feb. 3, 2015

(54) DISPLAY MODULE FOR DISPLAYING PASSENGER-SPECIFIC DISPLAY INFORMATION

(75) Inventors: René Stoll, Hamburg (DE); Martin Frey, Hamburg (DE); Reimer Hauschildt, Hohenaspe (DE)

(73) Assignee: Airbus Operations GmbH (DE)

( * ) Notice: Subject to any disclaimer, the term of this patent is extended or adjusted under 35 U.S.C. 154(b) by 1085 days.

(21) Appl. No.: 12/741,418

(22) PCT Filed: Oct. 31, 2008

(86) PCT No.: PCT/EP2008/064786
§ 371 (c)(1),
(2), (4) Date: Jun. 3, 2010

(87) PCT Pub. No.: WO2009/059932
PCT Pub. Date: May 14, 2009

(65) Prior Publication Data
US 2010/0245130 A1   Sep. 30, 2010
US 2012/0293342 A9   Nov. 22, 2012

Related U.S. Application Data

(60) Provisional application No. 61/001,821, filed on Nov. 5, 2007.

(30) Foreign Application Priority Data

Nov. 5, 2007   (DE) .......................... 10 2007 052 671

(51) Int. Cl.
| | |
|---|---|
| G08B 21/00 | (2006.01) |
| G08G 1/00 | (2006.01) |
| G06T 17/00 | (2006.01) |
| G09G 5/00 | (2006.01) |
| B64D 11/00 | (2006.01) |
| H04N 7/18 | (2006.01) |

(52) U.S. Cl.
CPC .............. *B64D 11/0015* (2013.01); *H04N 7/18* (2013.01)
USPC ........... 340/945; 340/901; 340/915; 340/994; 345/428; 345/630

(58) Field of Classification Search
USPC .......... 340/945, 901, 915, 994; 345/428, 630, 345/863
See application file for complete search history.

(56) References Cited

U.S. PATENT DOCUMENTS

| | | | |
|---|---|---|---|
| 6,393,343 B1 | 5/2002 | Frey et al. | |
| 6,745,111 B2 * | 6/2004 | Maruyama et al. | ............... 701/1 |

(Continued)

FOREIGN PATENT DOCUMENTS

| | | |
|---|---|---|
| CN | 1048478 A | 1/1991 |
| DE | 3444802 A1 | 6/1986 |

(Continued)

*Primary Examiner* — Fekadeselassie Girma
(74) *Attorney, Agent, or Firm* — Lerner, David, Littenberg, Krumholz & Mentlik, LLP

(57) ABSTRACT

A display module for displaying passenger-specific display information in an aircraft, comprising: a display, a control unit, a storage device, and a first interface, wherein the first interface is connected to the control unit, and wherein the control unit is designed, on the basis of a signal that is present at the first interface, to read out a storage device content stored in the storage device and associated with the signal in relation to display information, and on the basis of the read-out storage device content and of the signal present at the interface to control the display.

13 Claims, 11 Drawing Sheets

(56) References Cited

U.S. PATENT DOCUMENTS

| | | | |
|---|---|---|---|
| 6,813,777 B1* | 11/2004 | Weinberger et al. | 725/76 |
| 7,076,458 B2* | 7/2006 | Lawlor et al. | 705/35 |
| 8,166,506 B2* | 4/2012 | Callahan et al. | 725/76 |
| 2002/0015063 A1 | 2/2002 | Kopitzke et al. | |
| 2003/0160706 A1* | 8/2003 | Endress et al. | 340/945 |
| 2004/0119762 A1* | 6/2004 | Denoue et al. | 345/863 |
| 2004/0207581 A1 | 10/2004 | Miller | |
| 2005/0156777 A1* | 7/2005 | King et al. | 342/29 |
| 2005/0162396 A1* | 7/2005 | Meckesheimer et al. | 345/169 |
| 2006/0082566 A1* | 4/2006 | Akimoto et al. | 345/204 |
| 2006/0181105 A1* | 8/2006 | Puschmann | 296/65.01 |
| 2007/0061847 A1 | 3/2007 | Callahan et al. | |

FOREIGN PATENT DOCUMENTS

| | | |
|---|---|---|
| DE | 3942587 A1 | 6/1991 |
| DE | 29708460 U1 | 8/1997 |
| DE | 19705643 A1 | 8/1998 |
| DE | 10106498 C1 | 9/2002 |
| DE | 10207641 A1 | 9/2003 |
| DE | 102005002790 A1 | 8/2006 |
| EP | 1160160 A2 | 12/2001 |
| EP | 1338507 A2 | 8/2003 |
| GB | 2168880 A | 6/1986 |
| JP | 63019677 U | 2/1988 |
| JP | 01-125486 U | 8/1989 |
| JP | 02028708 A | 1/1990 |
| JP | 02213621 A | 8/1990 |
| JP | 02274087 A | 11/1990 |
| JP | 05075947 A | 3/1993 |
| JP | 09244566 A | 9/1997 |
| JP | 11296514 A | 10/1999 |
| JP | 2001077841 A | 3/2001 |
| JP | 3087586 U | 8/2002 |
| JP | 2002335444 A | 11/2002 |
| JP | 2002366340 A | 12/2002 |
| JP | 2003099670 A | 4/2003 |
| JP | 2003330697 A | 11/2003 |
| JP | 2004286480 A | 10/2004 |
| JP | 2006503341 A | 1/2006 |
| JP | 2007248862 A | 9/2007 |
| WO | 9904381 A1 | 1/1999 |
| WO | 0218207 A1 | 3/2002 |
| WO | 2005120068 A2 | 12/2005 |

* cited by examiner

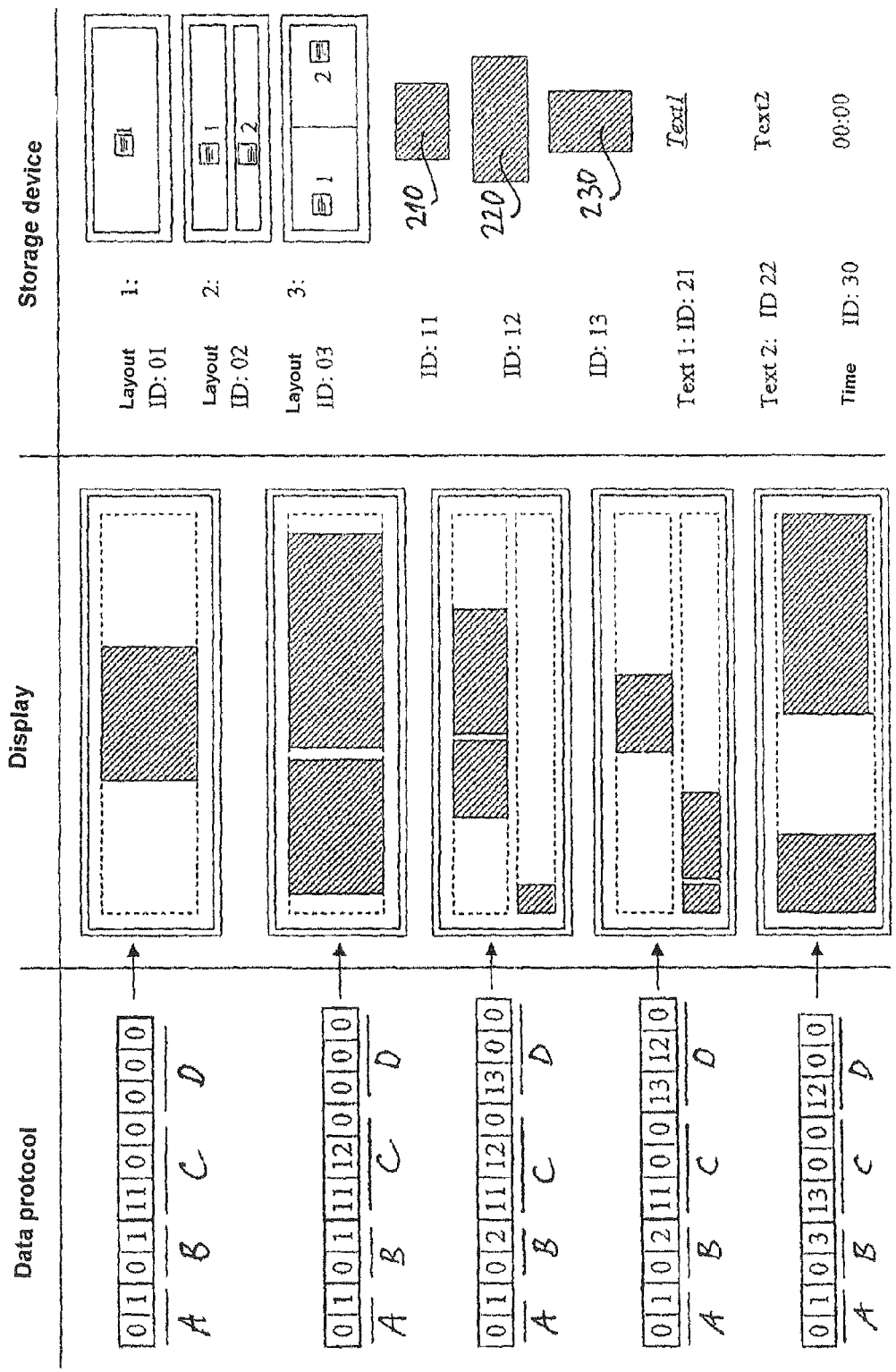

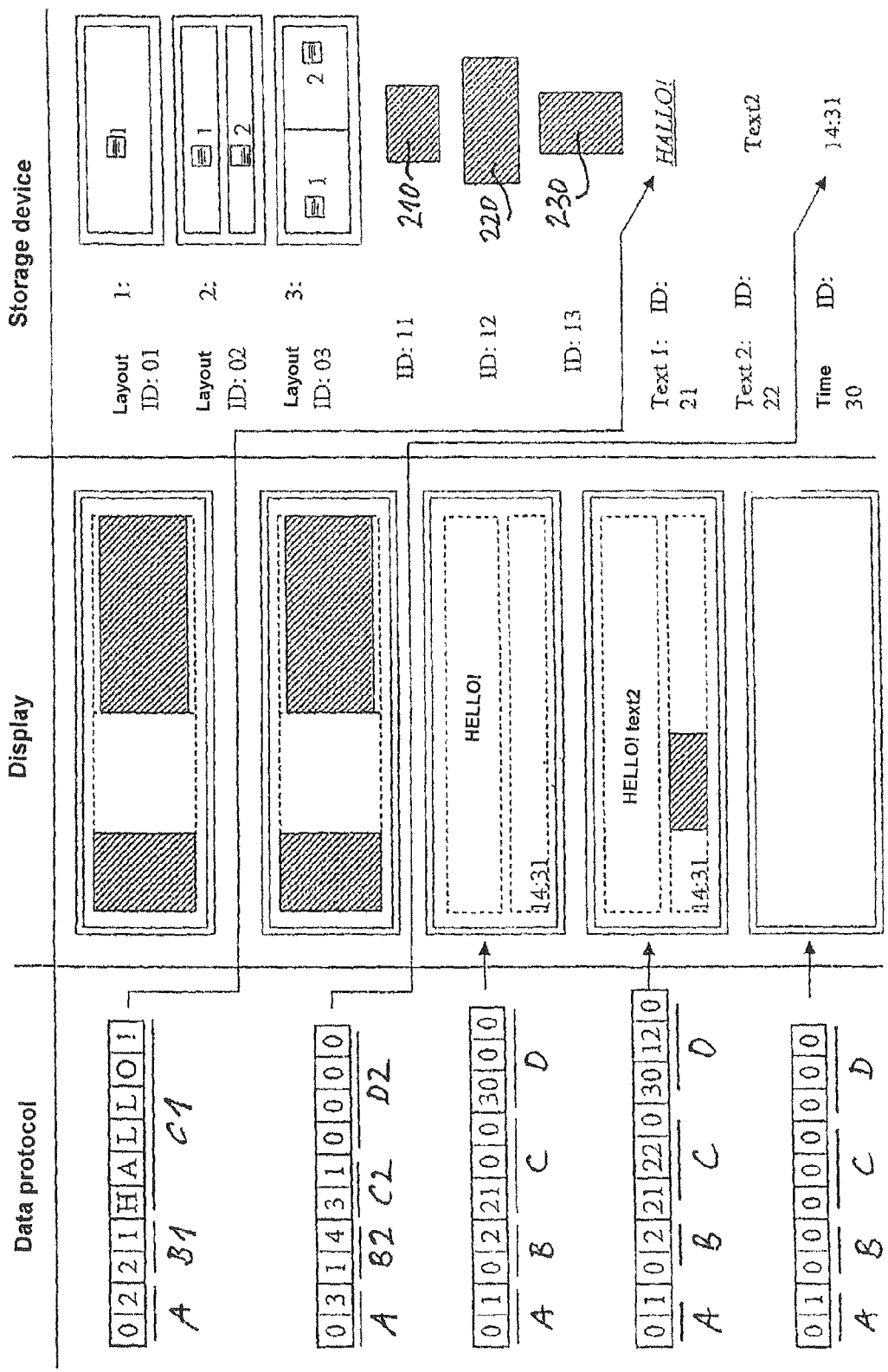

DISPLAY MODULE FOR DISPLAYING PASSENGER-SPECIFIC DISPLAY INFORMATION

CROSS-REFERENCE TO RELATED APPLICATIONS

This application is a national phase entry under 35 U.S.C. §371 of International Application No. PCT/EP2008/064786, filed Oct. 31, 2008, published in German, which claims the benefit of the filing date of U.S. provisional patent application No. 61/001,821, filed on 5 Nov. 2007, and of German patent application no. 10 2007 052 671.9, filed on 5 Nov. 2007, the disclosures of which are hereby incorporated herein by reference.

RELATED APPLICATIONS

The present invention claims priority of the U.S. provisional patent application No. 61/001,821, filed on 5 Nov. 2007, and of the German patent application no. 10 2007 052 671.9, filed on 5 Nov. 2007, with the present document referring to their contents.

FIELD OF THE INVENTION

The invention relates to an intelligent and flexible display module for displaying display information (display based sign), and to a method for operating such a display module, in particular a display module for displaying passenger-specific display information in an aircraft. Furthermore, the invention relates to an aircraft comprising such a display module.

BACKGROUND TO THE INVENTION

Known display modules for displaying display information (info signs) comprise a backlit light disc in which fixed pictograms are integrated. The region of the light disc in which a pictogram is located is transilluminable. On a printed circuit board that is located behind the light disc there are light-emitting diodes (earlier bi-pin lights). A pictogram is displayed in that activation takes place by applying a supply voltage, which switches on backlighting and renders the pictogram visible by means of transillumination.

The known display modules are associated with a disadvantage in that they are not flexible, because the pictograms are firmly integrated in the light disc. For example, if another pictogram, another combination of pictograms—or another opaque colour is required, a new light disc needs to be specified and qualified, which results in very considerable development expenditure and long delivery times. Since, for example, in some display modules the positions of the light-emitting diodes on the printed circuit board match the respective pictogram in order to obtain optimum transillumination, in the case of new pictograms it is then necessary to develop the printed circuit boards for these display modules anew. If, for example, a pictogram is not unequivocally understandable, then furthermore a brief text explanation is necessary. Since such a text, just like the pictograms, needs to be firmly entered into the light disc, the provision of a multi-language explanation is possible only to a limited extent. Because for reasons of available space the texts need to be very brief, in known display modules at most only text in two languages is possible. Moreover, when the display module is not active, the available free space cannot be used for other purposes.

It can also be considered a disadvantage of the known display modules that they at most comprise two independent chambers that function in the manner described above.

Furthermore, for reasons of space only two pictograms can be incorporated in a light disc. This becomes a disadvantage when, for example, new communication systems such as for example the "GSM on Board" system (global system for mobile communications on board) are used in aircraft. Such communication systems require further pictograms which, for example, cannot be implemented by a simple icon. It will thus be necessary in future to display more than two pictograms, wherein some of the pictograms can become more complex.

As a result of the lack of flexibility and the limit of two simple pictograms and of texts in two languages, the possible information content of the known display modules is very modest indeed.

PRESENTATION OF THE INVENTION

It may be considered to be an object of the invention to provide a display module for displaying display information with considerably improved flexibility and with considerably enlarged information content.

The object of the invention is met by the subject of the independent claims, while advantageous improvements of the invention are embodied in the dependent claims.

It should be pointed out that the embodiments of the invention described below equally relate to the display module, to the method for operating the display module, and to the aircraft.

According to an exemplary embodiment, a display module for displaying passenger-specific display information in an aircraft is provided, wherein the display module comprises a display, a control unit, a storage device and a first interface, wherein the first interface is connected to the control unit, and wherein the control unit is designed, on the basis of a signal that is present at the first interface, to read out the storage device content stored in the storage device and associated with the signal in relation to display information, and on the basis of the read-out storage device content and of the signal present at the interface to control the display.

Such a display module makes it possible for the passenger-specific display information, such as for example image elements and/or icons and/or video sequences and/or texts, to be stored in an internal storage device of the display module. Moreover, various display layouts can be stored, in layout regions and formatting, in the storage device of the display module. By way of the respective control system the display module can be informed as to which image element and/or which icon and/or which video sequence and/or which text are/is to be displayed with a particular display layout. The content of the individual regions defined in the display layout can be changed according to requirements so that usage as required of the available display space can be ensured.

Such a display module can be operated in a databus mode, wherein control is by way of the interface, which is a databus interface, and wherein the display module can both receive and send data by way of the databus. Such a display module also makes it possible to display a previously defined, or default, content if the databus signal is disturbed.

Such a display module can be installed in the interior of an aircraft, for example on a wall and/or a ceiling and/or in a seat and/or in a PSU (Passenger Service Unit). Such a display module can, for example, also be used in a smokers' compartment of an aircraft, when the smokers' compartment is, for example, equipped with automatic time-limited suspension of the fire alarm when a person enters it. The display module can display the off-state of the fire alarm and the remaining time of this state. The remaining time can be extended by the passenger who is smoking by activation of a button or a sensor, which is either integrated in the display module or is connected to the display module. Irrespective of this, in any desired use of the display module said display module can comprise a similar release button in order to, for example, make it possible for the passenger to establish contact with a flight attendant. Such a display module makes possible flexible use of the available space. The display module makes it possible to display more than two pictograms. The effort or expenditure for introducing new pictograms, pictogram combinations, video sequences, texts, formatting and colour variants can be simplified and shortened with such a display module. In this way costs and time can be saved. Text explanations of pictograms can be displayed in several languages. Further information of whatever type can be displayed beyond the function of the known display modules.

This embodiment also makes possible DC operation (DC data mode), wherein control takes place by way of the interface that is designed to transmit a bit pattern signal. In this arrangement data signals are transmitted by the aircraft system in the form of a bit pattern to the display module by way of the interface. In this way it is also possible for unilateral communication from the aircraft system to the display module to take place. Moreover, such a display module makes it possible to display the previously defined content if the bit pattern signal is disturbed.

Furthermore, this embodiment also makes possible a standalone mode where there is no data connection (e.g. in older aircraft models). Since both an applied voltage level and a signal are to be received, operation in standalone mode becomes possible, wherein control takes place by way of the interface that is designed to transmit a voltage level signal. Due to the signal that corresponds to the voltage, a previously determined content may be displayed.

The control unit can be further divided, wherein, for example, division into an application control unit and a display control unit is possible.

In order to place the contents to be displayed and the necessary configuration data in the storage device of the display module, it is, for example, possible to provide a wired upload mode and/or a wireless upload mode.

According to an exemplary embodiment, the display module comprises a second interface that is designed to couple a voltage supply to the display module.

Such a display module can, for example, be used for economical refitting of older aircraft in which the existing cabling for conventional display modules can be used. The existing cabling can, for example, comprise two DC lines. By means of these discrete DC lines, which can, for example, have a shared reference potential, the two chambers of the conventional display modules are switched on or off. For operation of a display module according to the present invention a DC data mode can be used, wherein one of the DC lines can be switched on permanently and can be used to provide the voltage supply. This DC line can be coupled to the second interface and can supply voltage to the display module. The other line can be coupled to the first interface and can be pulsed (switched on and off) so that a bit pattern can be transmitted by way of the first interface to the display module. In this way, unilateral communication from the aircraft system to the display module can take place. Such a display module also makes it possible to display a previously defined content if the pulsed signal experiences interference.

According to an exemplary embodiment, furthermore, the first interface is designed to couple a voltage supply to the display module. In this arrangement it is not mandatory to provide a second interface.

This embodiment supports DC operation, wherein the interface is used simultaneously to supply voltage to the display module and to transmit a bit pattern to the display module. The voltage supply and the clock pulse can take place by way of a line that is coupled to the interface, wherein the energy of the signal is also used to provide the voltage supply. As an alternative, it is possible to provide a dedicated line, coupled to the interface, for the voltage supply and for the clock pulse.

This embodiment also supports operation of the display module in a standalone mode, wherein the interface is at the same time provided for the voltage supply and for signal transmission. In this arrangement both an applied voltage level, which for example differs from the supply voltage, and a signal are to be taken up. Operation in the standalone mode can, for example, take place with a line that is coupled to the interface. This line is used both as a voltage supply and for transmitting a voltage level signal. The standalone mode can be activated in that a corresponding voltage is applied to the line. On the basis of the signal that corresponds to the voltage, in this arrangement a previously determined content can be displayed. As an alternative, a dedicated line each can be provided for voltage supply and for transmission of the voltage level signal.

According to an exemplary embodiment, furthermore, the first interface is also designed to couple a voltage supply to the display module, wherein the second interface is also connected to the control unit, wherein the control unit is designed, on the basis of a signal present at the second interface, to read out a second storage device content with regard to display information, and on the basis of the read-out second storage device content and of the signal present at the second interface to control the display.

This embodiment supports, for example, a standalone mode, wherein, for example, the cabling that is present for the conventional display modules can be used. This present cabling can, for example, comprise two DC lines. If a corresponding voltage is applied to one of the two lines, which are coupled to the respective interfaces, then a previously determined content is displayed. For example, if e.g. 5V is applied to a line, then a first content is displayed; if e.g. 5V is applied to the other line, then a second content is displayed; if e.g. 5V is applied to both lines, then a third content is displayed.

According to an exemplary embodiment, the control unit is designed to control the display with regard to the presentation position and/or the presentation size of the display information.

This embodiment makes it possible to achieve optimum scaling and placement of the display information in the display. If, for example, a division of the control unit into an application control unit and a display control unit is provided, then the application control unit ensures optimal scaling and placement of display information.

According to an exemplary embodiment, the display module further comprises a cover member that is designed as a device providing mechanical protection for the display, mechanical adaptation to the surroundings, and/or as an antiglare device against scattered light.

With such a cover member, which can, for example, be an adapter lens, optimum visibility of the display information is ensured. The cover member can be a transparent material, e.g. plastic or glass, and can have the following tasks: visual fitting of the display, which is for example rectangular, in the design of the surroundings; covering up the edge around the usable display area; and mechanical attachment of the display module. The cover member can, for example, be oval or rectangular in shape.

According to an exemplary embodiment, the control unit, the storage device and the interfaces are integrated in a controller board.

A controller board can be used for an efficient and compact design of the display module. Furthermore, the controller board can be incorporated in the display module by means of the cover member. It is also possible to integrate further optional components in the controller board (e.g. a wireless interface and/or a display interface).

According to an exemplary embodiment, at least one of the interfaces is a wireless interface.

This exemplary embodiment makes it possible to provide a device variant of the display module with a wireless interface (for example a wireless databus interface), wherein the display module operates in a wireless databus mode, and the functionality and the functional extent are identical to that of the databus mode.

According to an exemplary embodiment, the display information is information that comprises at least one element of a group comprising image elements, video sequences, text and formatting.

This embodiment makes it possible to create passenger-specific display information optimally according to a particular purpose. Some information, for example "No smoking" or "Fasten seat belts", can be displayed with the use of simple pictograms. Other information, for example "Switch off mobile telephones", might be better displayed by means of an image/text combination or by means of a video sequence. Further specific information can be displayed in several languages by static or running texts (e.g. flight altitude, remaining flight time; connecting flights, stock market prices, weather forecast and headline news. Furthermore, several image elements and/or video sequences and/or text contents can simultaneously and flexibly be displayed in various regions of the display.

According to an exemplary embodiment, the control unit is designed to control the display on the basis of display information comprising text and corresponding text formatting.

In this way the text contents and/or text objects, which can be altered during their runtime, can be displayed efficiently, wherein the formatting (configuration data) can have been determined previously and can be stored in the storage device of the display module. Only the text content can be changed over time by way of the databus. In this way it is possible in a simple and efficient manner to update and display data (e.g. flight altitude, remaining flight time, connecting flights, stock market prices, weather forecast and headline news) during the flight. Furthermore, text contents and/or text objects can be incorporated in layout regions in a manner that is similar to that of pictograms and video sequences.

According to an exemplary embodiment, the control unit is designed to read the storage device content in or out by way of one of the interfaces.

As a result of this measure, new pictograms and/or video sequences and/or text contents and/or formatting can be flexibly stored in the display module in a flexible manner. Moreover, in this manner the stored data can be simply and efficiently modified and/or changed if required.

According to an exemplary embodiment, the display module comprises a clock module, wherein the control unit is designed, on the basis of a signal that is present at one of the interfaces, to read out the clock module, and on the basis of the read-out clock module and of the signal present at the interface to control the display.

By means of a clock module the local time can be displayed on the display module. In this arrangement the initial time can be transmitted by the aircraft system and can be synchronised anew at corresponding intervals. Thus, for example if another time zone is reached, the time can be updated. The clock module can also be incorporated in layout regions such as pictograms, video sequences and text objects, and can, for example, be used in databus mode.

According to an exemplary embodiment, the display module comprises a display module test device, wherein the display module test device is designed to cause a data exchange for test purposes.

In this way bilateral communication between the aircraft system and the display module can take place in that a test system, for example a BITE (Built-In Test Equipment) is used for testing the display module. In this arrangement it would be possible, for example, for the BITE data to be sent from the display module to the aircraft system. This can, for example, take place in databus mode.

According to an exemplary embodiment, an aircraft information system with a display module according to the invention is provided, wherein the aircraft information system furthermore comprises a cabin management system and a flight attendant panel, wherein the flight attendant panel is designed to control the display module by way of the management system.

In this arrangement the flight attendants can, for example by way of an FAP (Flight Attendant Panel) with the use of various operating elements, manually carry out desired settings of the display module or adjust them to conditions in flight. The CMS (Cabin Management System) takes care of smooth technical implementation of the corresponding control instructions.

According to an exemplary embodiment, an aircraft with a display module according to the invention is provided.

By means of this measure an effective communication system in an aircraft is provided, which communication system supports bilateral communication between the aircraft system and the display module. Data such as, for example, the number of the display layout, identification numbers of the pictograms, video sequences, text contents and/or time for each region defined in the layout can be sent from the aircraft system to the display module. Test data, for example BITE data, can, for example, be transmitted in databus mode from the display module to the aircraft system.

According to an exemplary embodiment, a method for displaying passenger-specific display information in an aircraft is provided, wherein the method comprises: applying a signal to an interface of a display module; reading out storage device content with regard to display information of the display module on the basis of the signal applied to the interface; and controlling a display on the basis of the read-out storage device content and of the signal applied to the interface.

It should be noted that the embodiments, described hereinafter, of the invention apply equally to the device, the method and the aircraft.

The individual features can of course also be combined, as a result of which, in part, advantageous effects may arise which exceed the sum of the individual effects, even if such advantageous effects are not expressly described.

These and other aspects of the present invention are explained and clarified with reference to the exemplary embodiments described below.

BRIEF DESCRIPTION OF THE DRAWINGS

Below, exemplary embodiments are described with reference to the following drawings.

FIG. 10 shows some examples of the behaviour of the display module in the databus mode.

FIG. 11 shows some further examples of the behaviour of the display module in the databus mode.

DETAILED DESCRIPTION OF EXEMPLARY EMBODIMENTS

Below, exemplary embodiments of the invention are described with reference to the enclosed drawings.

Figure 1:
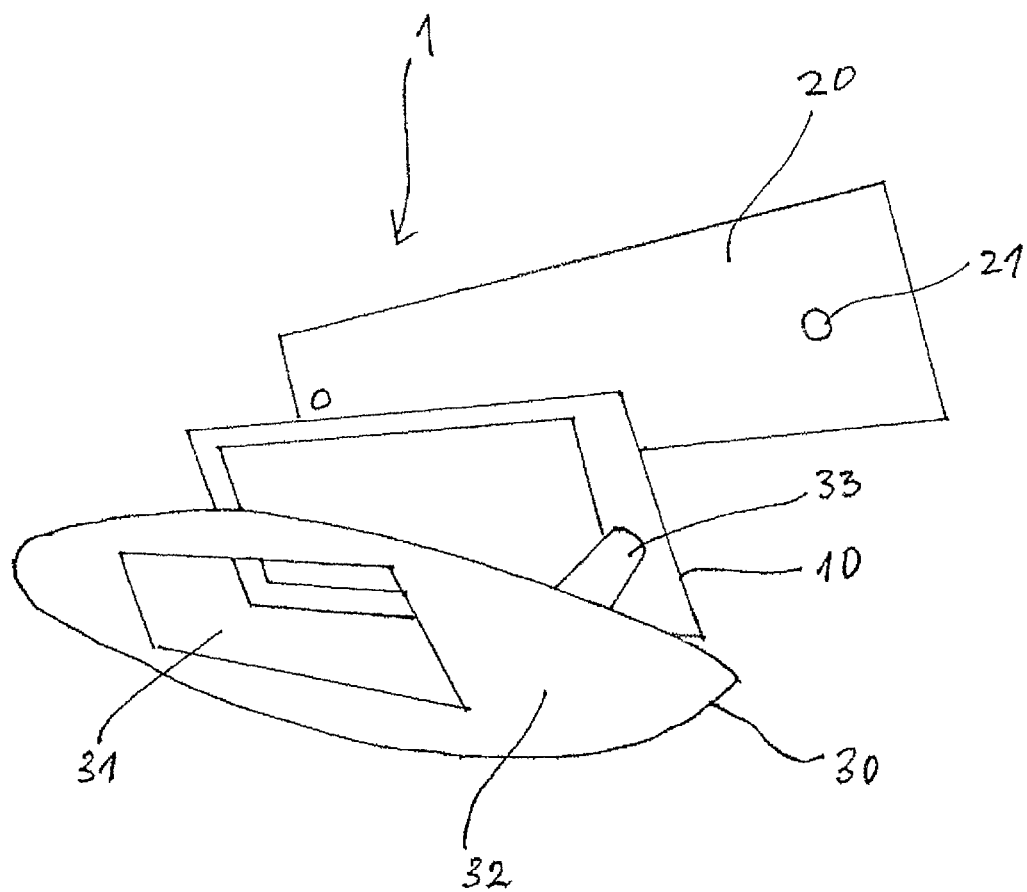
FIG. 1 shows an exemplary diagrammatic view of a mechanical design of the display module.

FIG. 1 shows a diagrammatic view of the mechanical design of the display module. The display module 1 shown in FIG. 1 comprises a display 10, a cover member 30 and a controller board 20.

The display 10 can, for example, be an OLED display (organic light-emitting diode display), because OLED technology makes it possible to produce very thin, light and luminous displays. The size and shape of the display 10 can vary depending on requirements and applications. The display can, for example, be rectangular as shown in FIG. 1.

The components required for the function of the display modules, such as control units (e.g. application control unit, display control unit) and interfaces (e.g. display interface, databus interface, DC interface and wireless interface) or storage devices can, for example, be integrated in the controller board 20. The controller board 20 comprises, for example, holes 21 that are provided for assembly of the controller board in the overall structure of the display module 1.

The cover member 30, which can, for example, be an adapter lens, provides mechanical protection for the display 10 and mechanical adaptation of the display module to the surroundings. Furthermore, the cover member 30 can serve as an anti-glare device against scattered light. The cover member 30 can comprise a transparent material, e.g. plastic or glass, and can have the following tasks: visual fitting of the display 10, which is for example rectangular, in the design of the surroundings; covering up the edge around the usable display area; mechanical attachment of the display module; and receiving the controller board. The cover member can, for example, be oval or rectangular in shape. Except for a cut-out 31 for the display 10, the rear of the cover member can be lacquered with a non transparent lacquer so that masking 32 arises. The colour of the lacquer can be adjusted individually, with both the colour and the masking 32 varying, depending on requirements and the environment. On the rear of the cover element 30 there are, for example, mechanical receiving devices (not shown) for the display 10 and the controller board 20, as well as the attachment elements 33 for installing the display module.

Figure 2:
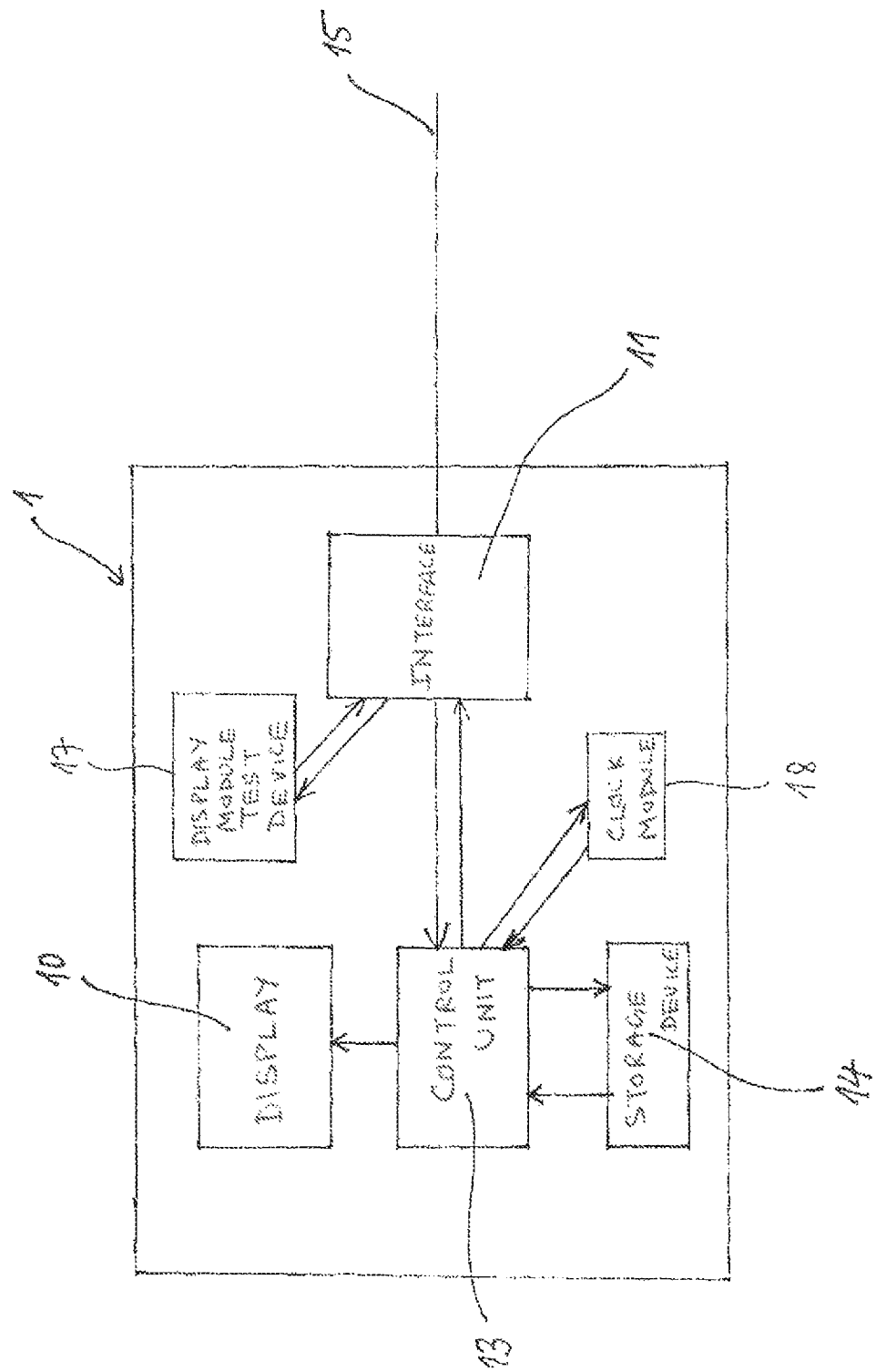
FIG. 2 shows a diagrammatic view of the design and functionality of the display module according to an exemplary embodiment.

FIG. 2 shows a diagrammatic view of the design and the functionality of the display module 1 according to an exemplary embodiment, wherein this embodiment is, for example, suitable for databus mode. The display module 1 comprises a display 10, an interface 11, a control unit 13, a storage device 14, a cable connection or a wireless connection 15 of the interface 11 with the aircraft system (not shown), a display module test device 17 and a clock module 18. In the storage device 14, passenger-specific display information is stored, for example image elements and/or icons and/or video sequences and/or texts. Furthermore, various layouts of the display to form layout regions and formatting are stored in the storage device of the display module.

The display is controlled by means of the control unit 13. The control unit 13 is connected to the interface (e.g. a databus interface or a wireless databus interface) 11, wherein the interface 11 is connected to the aircraft system by way of a databus (not shown) by means of the connection 15. Data signals from the aircraft system are transmitted by means of the connection 15 to the interface 11 by way of the databus. On the basis of a signal present at the first interface 11, the control unit 13 accesses the storage device 14 and reads out a corresponding storage device content with regard to display information. On the basis of the read-out storage device content and of the signal present at the interface 11, the control unit 13 then controls the display 10. In this arrangement, on the basis of the signal present at the first interface 11, the control unit 13 selects one of the previously defined layouts, which has been stored in the storage device 14, of the display 10 in layout regions. Furthermore, the control unit 13 processes the display information read-out of the storage device 14 in order to achieve optimum scaling and placement of the display information in the display 10. Thus all the display information (image elements, video sequences, text or time information) is associated with a corresponding region and is displayed completely within the region. The control unit 13 can also be divided into several individual components, wherein, for example, division into an application control unit and a display control unit is possible. In this case an application control unit ensures optimal scaling and placement of display information.

If data transmission by way of the databus is disturbed or non-existent, a previously defined (default) content is shown.

In a display module 1 shown in FIG. 2 the clock module 18 can be installed as an individual component that can be connected to the control unit 13—in a manner similar to that of the storage device 14. The clock module 18 displays the current local time on the display module. In this arrangement the initial time is transmitted by the aircraft system and is synchronised anew at corresponding intervals. Thus, for example, if another time zone is reached, the time can be updated. The clock module can also be incorporated in layout regions such as pictograms, video sequences and text objects.

The display module test device 17 can, for example, be an item of BITE (Built-In Test Equipment). In this arrangement the BITE data is transmitted from the display module to the aircraft system by way of the interface 11 by means of the connection 15.

The DC data mode of the display module 1 according to FIG. 2 can be used in that the interface 11 is designed to transmit data signals from the aircraft system in the form of a bit pattern to the display module 1. In this arrangement the interface 11, for example, can be used both for transmitting data signals and for coupling a voltage supply (not shown) by way of the connection 15. In this case the energy of the signal is also used for the voltage supply. As an alternative, the voltage supply can also take place independently of the interface 11.

On the basis of a signal that is present at the first interface 11 the control unit 13 accesses the storage device 14 and reads out a corresponding storage device content with regard to display information. On the basis of the read-out storage device content the control unit 13 then controls the display 10. In this arrangement the control unit 13 only at this point selects one of the previously defined layouts of the display 10 into layout regions, which layouts have been stored in the storage device 14. Furthermore, the control unit 13 processes the display information read-out from the storage device 14 in order to achieve optimum scaling and placement of the display information in the display 10. In this arrangement the connection 15 can comprise a line, wherein the signal energy supplied by way of this line is not only used for transmitting the bit pattern but also for supplying voltage to the display 1.

DC data mode is an operating mode which, for example, is intended especially for refitting older aircraft. For the connection 15 it is possible to use the DC lines that are already in place to provide the supply to the originally-used display module. For the display module in DC operation only one of the lines used for the connection 15 is permanently switched on. Thus, the voltage supply to the display module by way of the interface 11 is ensured. The second line, used for the connection 15, is pulsed (switched on and off) by the aircraft system in order to transmit a bit pattern to the display module by way of the interface 11. Thus, unilateral communication from the aircraft system to the display module takes place. In this arrangement the achievable transmission rate is relatively modest, and consequently the scope of functions is limited when compared to that in databus mode.

The transmitted bit pattern is, for example, firmly defined and always has the same length. For example, a fixed identification number for pictograms or video sequences is associated with each bit. If a bit has been set, the pictogram or the video sequence is displayed which is stored under the corresponding identification number. If the bit has not been set, then the associated pictogram or the video sequence is not displayed.

The display layout is independently selected by the display module 1 depending on the activated contents.

If the pulsed signal is disturbed, a previously defined (default) content is displayed.

This embodiment, shown in FIG. 2, also makes it possible, for example, to operate the display module in a standalone mode if there is no databus connection (e.g. in older aircraft models) in that the interface 11 is provided for voltage supply and for signal transmission. Since it is possible to take up both a voltage level applied to the connection 15 and a signal, standalone mode can operate in that a corresponding voltage is applied to the line to which the interface is coupled. Due to the signal that corresponds to the voltage, a previously determined content that has been stored in the storage device 14 can be displayed.

Figure 3:
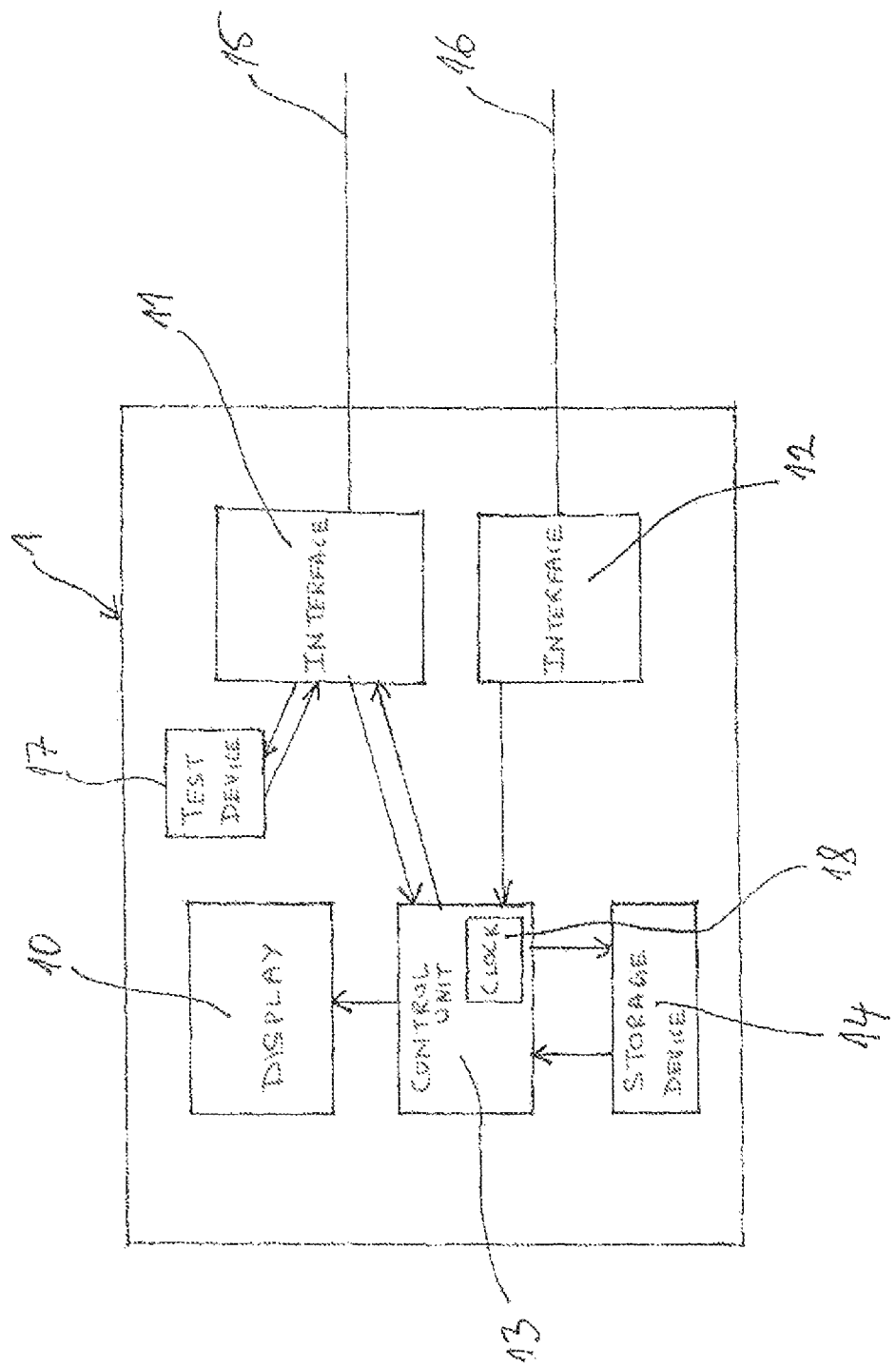
FIG. 3 shows a diagrammatic view of the design and functionality of the display module according to a further exemplary embodiment.

FIG. 3 shows a diagrammatic view of the design and functionality of the display module 1 according to an exemplary embodiment, comprising two interfaces 11 and 12, wherein this embodiment, too, in addition to a databus mode is also suitable for DC data mode and/or standalone mode. When compared to the embodiment described in relation to FIG. 2, the display module 1 comprises an additional interface 12 that is connected to the control unit 13 independently of the interface 11, and comprises an additional wired connection or wireless connection 16 between the second interface 12 and the aircraft system (not shown). In the storage device 14 of the display module, additionally also configuration data for the individual operating modes are stored.

If only the interface 11 is actively coupled to the aircraft system, the functionality of the display mode resembles the functionality of the embodiment shown in FIG. 2. Thus the display module according to the embodiment shown in FIG. 3 can, for example, be used in databus mode.

The DC data mode of the display module 1 according to FIG. 3 can be operative in that the interface 12 is designed to couple a voltage supply (not shown) to the display module 1 by way of connection 16, and connection 15 is designed to transmit data signals from the aircraft system in the form of a bit pattern to the display module 1. The functionality of the interface 11, of the control unit 13, of the storage device 14 and of the display 10 is analogous to that of the exemplary embodiment according to FIG. 2.

The DC data mode is an operating mode which is, for example, intended especially for refitting older aircraft. For the connections 15 and 16 it is possible to use the DC lines that are already in place to provide the supply to the originally-used display module, wherein for the connection 15 one of two DC lines, and for the connection 16 the other of two existing DC lines are used. For the display module in DC operation only the line that is used for connection 16 is permanently switched on. In this way the voltage supply to the display module by way of the interface 12 is taken care of. The second line, which is used for connection 15, is pulsed (switched on and off) by the aircraft system in order to transmit a bit pattern to the display module by way of the interface 11. Thus, unilateral communication from the aircraft system to the display module takes place. In this arrangement the achievable transmission rate is relatively modest, and consequently the scope of functions is limited when compared to that in databus mode.

The transmitted bit pattern is, for example, firmly defined and always has the same length. For example, a fixed identification number for pictograms or video sequences is associated with each bit. If a bit has been set, the pictogram or the video sequence is displayed which is stored under the corresponding identification number. If the bit has not been set, then the associated pictogram or the video sequence is not displayed.

The display layout is independently selected by the display module 1 depending on the activated contents.

If the pulsed signal is disturbed, a previously defined (default) content is displayed.

Operation of the display module 1 in standalone mode according to FIG. 3 can take place, for example, if there is no databus connection. The already existing DC lines, which are used in DC data mode, are used for connections 15 and 16. Both interfaces 11 and 12 couple the display module to a voltage supply (not shown) by way of the connections 15 and 16. If a corresponding voltage is applied to one of the connections 15 and 16 that are coupled to the interfaces, a previously determined content that is stored in the storage device 14 is displayed. In this arrangement the control unit 13 selects the content (configuration data) associated with the respective line. With simultaneous application of corresponding voltages to both lines 15 and 16, a content is displayed that is independent of the contents of the individual application. If, for example, 5V is applied to a line, then a first content is displayed. If, for example, 5V is applied to the other line, then a second content is displayed. If, for example, 5V is applied simultaneously to both lines, then a third content is displayed.

Furthermore, FIG. 3 shows a device variant, wherein the clock module 18 is designed as part of the control unit 13.

With regard to all the exemplary embodiments stated above in the context of FIGS. 2 and 3 the selection of the division into layout regions in databus mode is determined by the aircraft system, while in DC mode and in standalone mode the selection is made independently by the display module, depending on the activated contents. A determination as to which layout is to be selected with a given combination of active contents is made in the context of content uploading. Likewise, the allocation of a pictogram/a video sequence/a text/formatting in the three configuration data variants mentioned above takes place in the context of content uploading.

In order to place, the contents to be displayed and the necessary configuration data in the storage device 14 of the display module 1, there are two upload modes, namely a wired upload mode and a wireless upload mode. The wired upload mode is provided for uploading data by way of the databus interface. In this arrangement the data can be transmitted by way of the aircraft system or it can originate from a programming device directly connected to the databus interface. The wired upload mode is activated by way of the databus with the use of a special command. The wireless upload mode is provided for uploading data by way of the wireless databus interface. The data is transmitted wirelessly from a programming device to the display module. The wireless upload mode can be activated by way of a wired interface. Depending on the operating mode, this can take place either with an instruction by way of the databus interface or with a defined bit pattern by way of the interface present in DC operation.

In the wireless upload mode various status messages are displayed by way of the display module. For example, it is possible to determine which modules are within reach of the programming device (whether or not they are connected to the programming device).

With both upload modes the same data can be loaded in the display of the display module: pictograms and video sequences, fonts for text modules and the clock module 18, contents and formats of text modules, configuration data for the individual operating modes.

Figure 4:
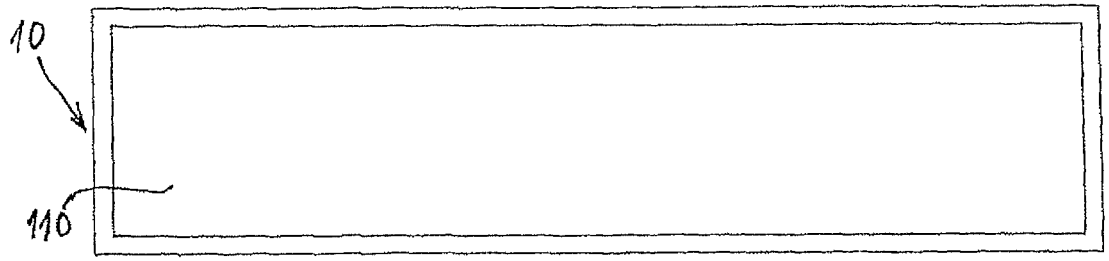
FIG. 4 shows an exemplary layout of the display with a layout region.

FIG. 4 shows an exemplary layout of the display 10 with a layout region 110.

Figure 5A:
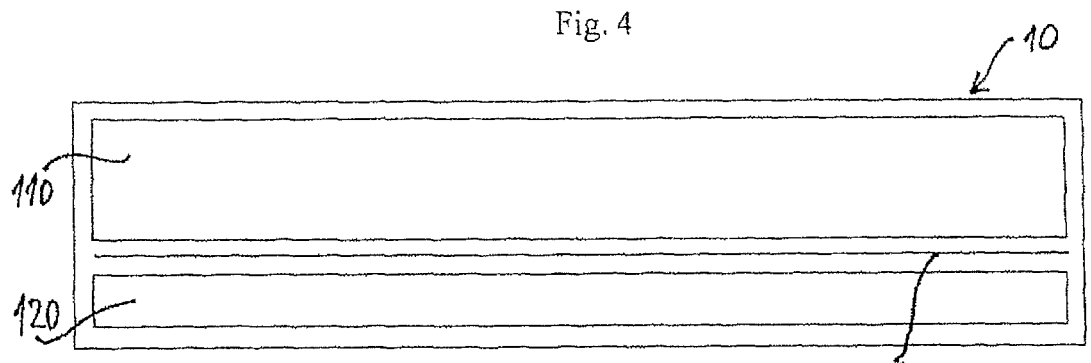
FIGS. 5*a* and 5*b* show exemplary layouts of the display with two layout regions.
Figure 5B:
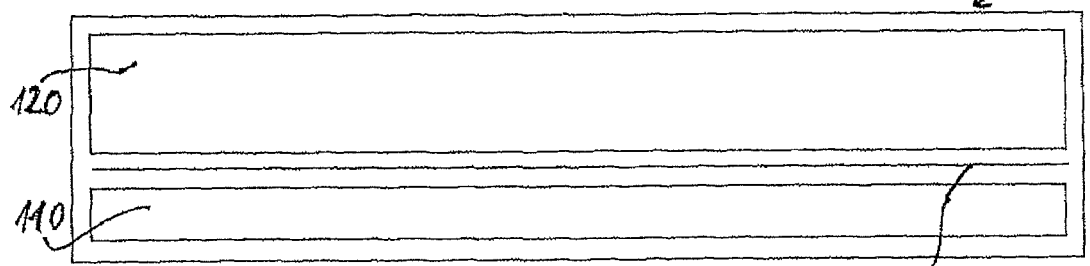

FIG. 5a shows an exemplary layout of the display 10 with two layout regions 110 and 120, wherein region 110 is positioned above region 120, and the regions 110 and 120 are separated by a horizontal region divider 115. FIG. 5b shows another exemplary layout of the display 10 with reversed positioning of the regions 110 and 120.

Figure 6:
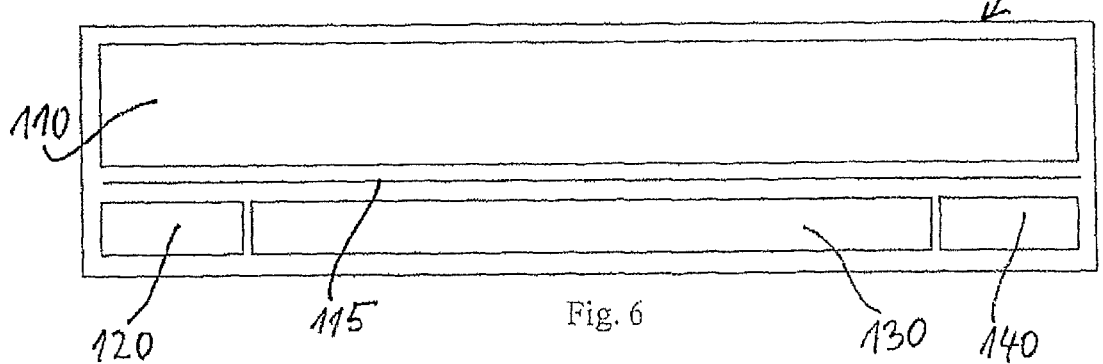
FIG. 6 shows an exemplary layout of the display with four layout regions.
Figure 7A:
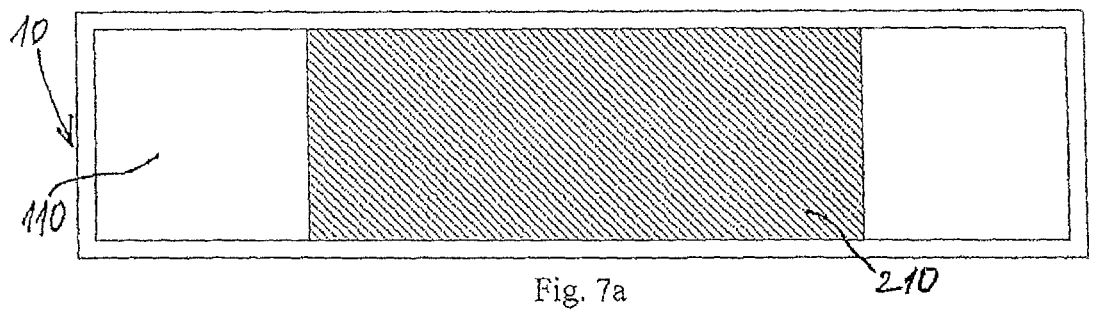
FIGS. 7*a* to 7*e* show some examples of processing or changing image elements within the layout regions of the display.
Figure 7B:
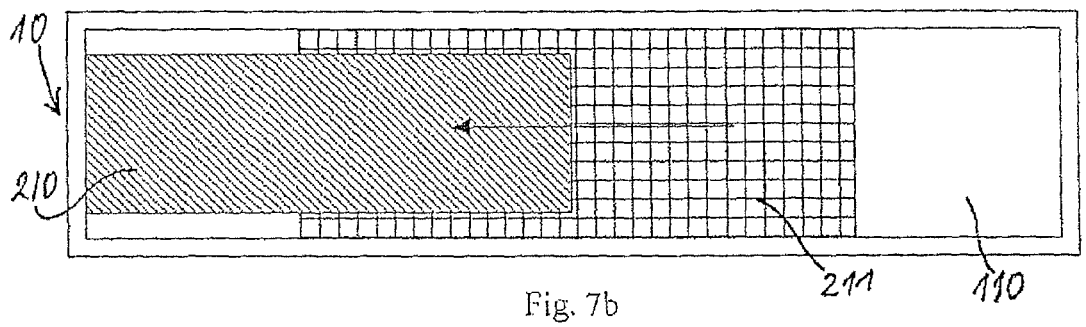
Figure 7C:
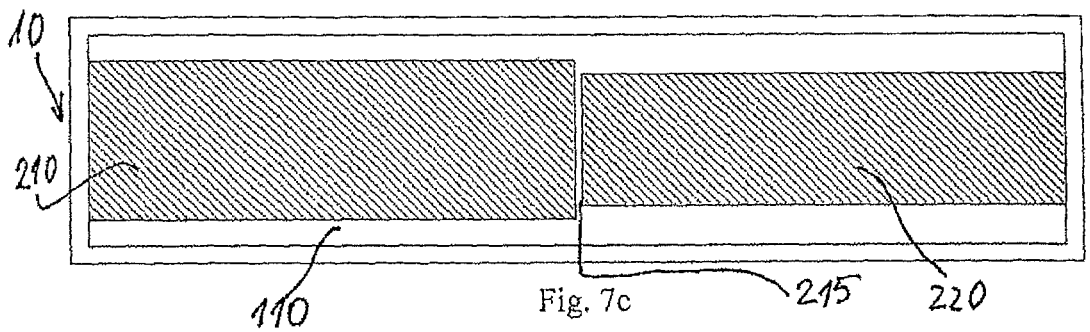
Figure 7D:
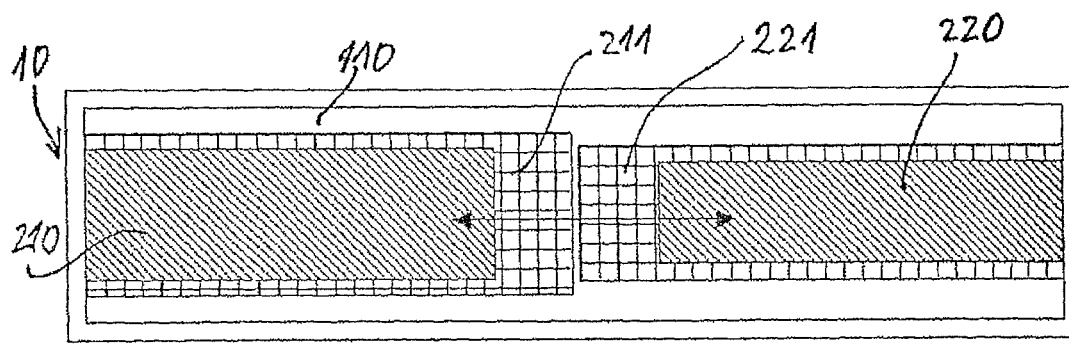
Figure 7E:
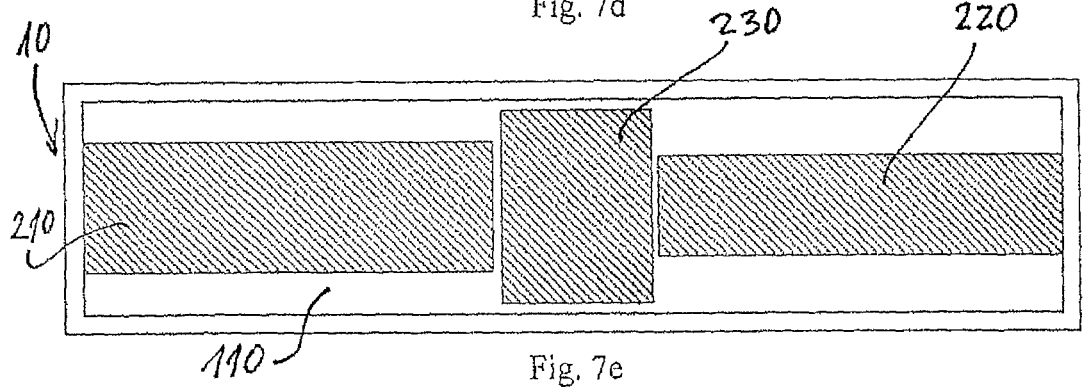
Figure 8A:
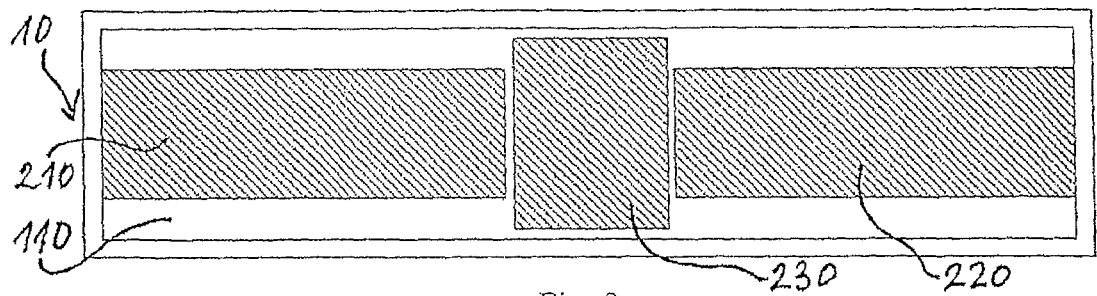
FIGS. 8*a* to 8*d* show an exemplary change in the layout of the display and of the image display.
Figure 8B:
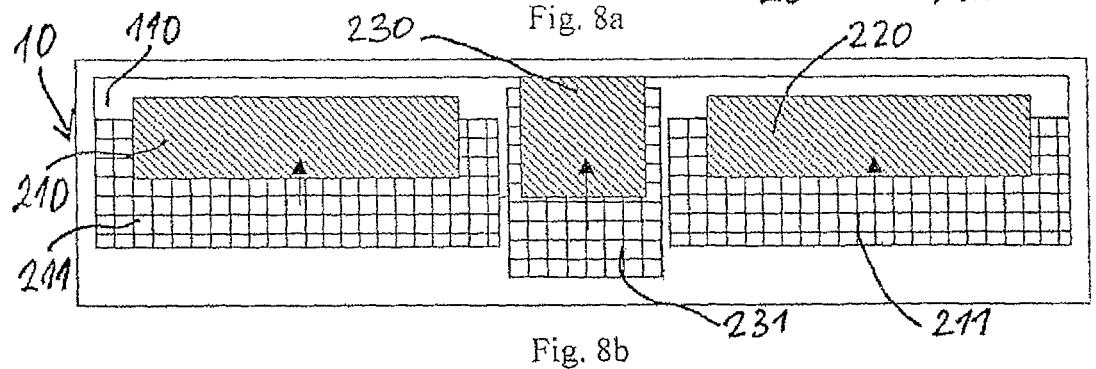
Figure 8C:
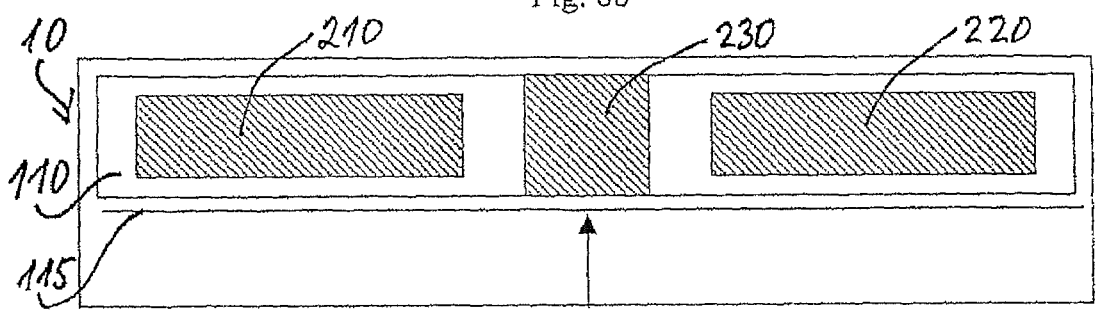
Figure 8D:
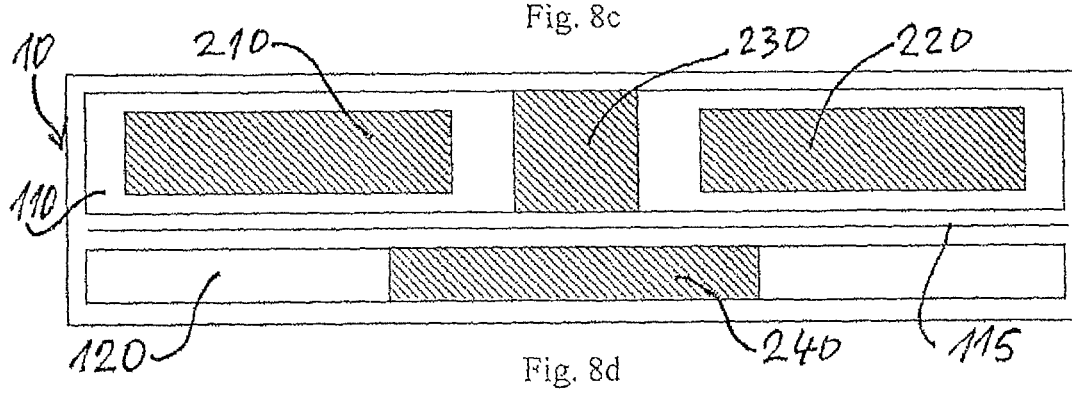
Figure 9A:
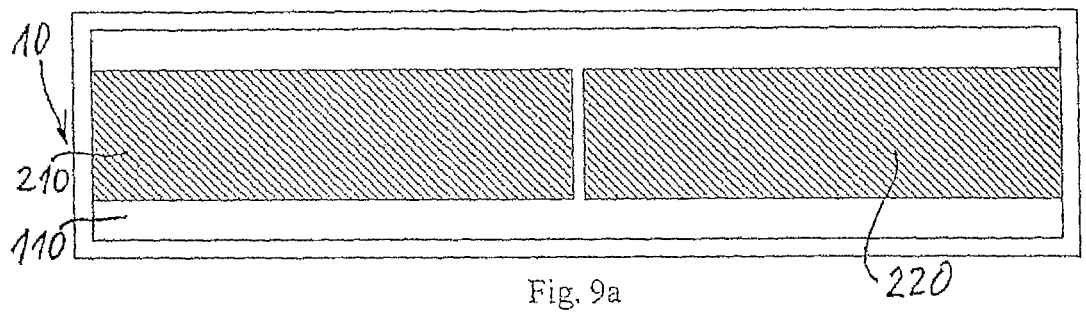
FIGS. 9*a* to 9*d* show an exemplary change in the layout of the display and of the image display with a region jump.
Figure 9B:
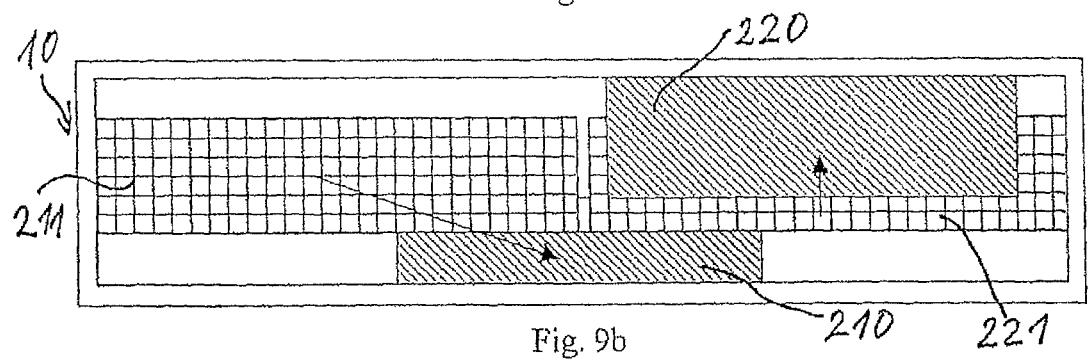
Figure 9C:
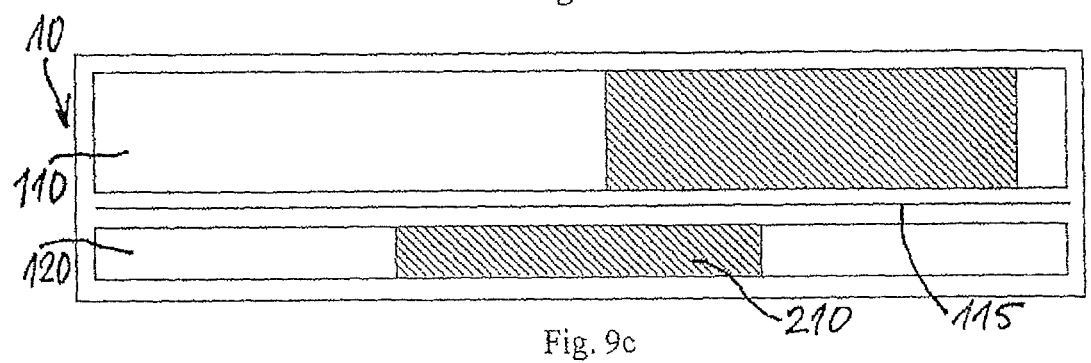
Figure 9D:
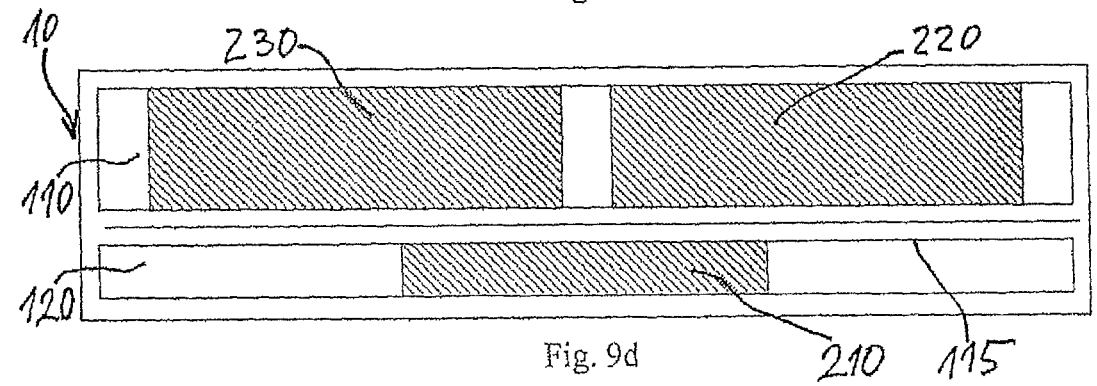

FIG. 6 shows an exemplary layout of the display 10 with four layout regions 110, 120, 130 and 140. The regions 120, 130 and 140 are positioned side-by-side in a row underneath region 110 and are separated from the latter by means of a horizontal region divider 115.

FIG. 7 shows some examples of processing image elements within the layout regions of the display, wherein one or several image elements can also be replaced by video sequences. FIG. 7a shows a layout of the display 10 with a layout region 110, wherein an image element 210 is displayed within the layout region 110. FIG. 7b shows a movement and scaling of the image element 210, which movement and scaling are indicated by an arrow, from its original placement 211. In this process a free space arises in region 110, into which space (in FIG. 7c) a second image element 220 is inserted. The image elements 210 and 220 are separated from each other at a defined distance 215. FIG. 7d shows movements and scaling, indicated by the arrows, of the image elements 210 and 220 from their original placement 211 and 221. In this process a free space arises in region 110, into which space (in FIG. 7e) a third image element 230 is inserted.

FIG. 8 shows an exemplary change in the layout of the display and of the image display. FIG. 8a shows a layout of the display 10 with a layout region 110, wherein within the region 110 three image elements 210, 220 and 230 are displayed. FIG. 8b shows movements, indicated by arrows, and scaling of the image elements 210, 220 and 230 from their original placements 211, 221 and 231. In this process a free space arises in region 110, into which space (in FIG. 8c) a horizontal region divider 115 is inserted, and thus below region 110 a second region 120 arises. In FIG. 8d a fourth image 240 is displayed in the second region 120.

FIG. 9 shows an exemplary change of the layout of the display 10 and of the image display with a region jump. FIG. 9a shows a layout of the display 10 with a layout region 110, wherein within region 110 two image elements 210 and 220 are displayed. FIG. 9b shows movements and scaling, indicated by arrows, of the image elements 210 and 220 from their original placements 211 and 221. In this process the image element 210 is placed underneath the image element 220. In FIG. 9c a horizontal region divider 115 is inserted between the image elements 210 and 220 so that the image element 210 is located in region 110 and the image element 220 is located in a newly defined region 120. In FIG. 9d a third image element 230 is inserted in the still available space in region 110.

The reference characters already used with reference to FIGS. 1 to 9 are identically used in FIGS. 10 and 11.

FIG. 10 shows some examples of the behaviour of the display module in a databus mode.

The first table column in FIG. 10 shows some examples of data protocols for controlling the display module in databus mode. The data protocols, shown in FIG. 10, for dividing the display 10 into the layout regions and for displaying image elements or video sequences comprise four sections A to D. In section A an instruction identification number is communicated to the display module, in section B an identification number of the layout of the display 10, in section C an identification number for the image elements or video sequences displayed in the layout region 110, and in section D an identification number for the image elements or video sequences displayed in the second layout regions 120. The third column shows some, exemplary associations of the respective identification numbers (for the layouts, image elements, texts or the clock module) in relation to the display information stored in the storage device. For example, the layout shown in FIG. 4 corresponds to identification number ID: 01, the layout shown in FIG. 5a corresponds to identification number ID: 02 etc. The middle column shows the images, associated with the exemplary data protocols listed in the first column, of the display 10. The association between the data protocols and the images on the display is indicated by means of arrows.

FIG. 11 shows some further examples of the behaviour of the display module in the databus mode. The third column shows some exemplary associations of the respective identification numbers (for the layouts, image elements, texts or the clock module) in relation to the display information stored in the storage device. For example, the layout shown in FIG. 4 corresponds to identification number ID: 01, the layout shown in FIG. 5a to identification number ID: 02 etc. By means of the data protocol shown in the first line of the first column a particular text content (presently, for example "HELLO!") is defined. This data protocol comprises three sections A, B1 and C1. In section A an instruction identification number is communicated to the display module, in section B1 a text identification number, and in section C1 a text content. This text content is then stored in the storage device under its identification number ID: 21. By means of the data protocol shown in the second line of the first column, for example an update of the time or an initial time or some other time (in the present example "14:31") is entered. This data protocol comprises four sections A, B2, C2 and D2. In section A an instruction identification number is communicated to the display module, in section B2 the hour and in section C2 the minutes. Section D2 is not used for entering time. The time entered is then stored in the storage device 14. After the text has been defined and the time has been entered, the text and the time are displayed on the display 10. The third and fourth lines of the first column show examples of the data protocols used for this. These data protocols comprise four sections, A to D. In section A an instruction identification number is communicated to the display module; in section B an identification number of the layout of the display; in section C an identification number relating to the texts, image elements, video sequences or the times displayed in the layout regions 110; and in section D an identification number relating to the image elements, texts, image elements, video sequences or times displayed in the second layout regions 120. The corresponding information appearing on the display 10 is shown in the third and fourth lines of the second column. The last lines of the first and second columns show a layout of the display 10 with an empty layout region and the corresponding data protocol.

The first two columns of the compiled FIGS. 10 and 11 show a time sequence of data protocols and an associated time sequence of information displays.

Figure 12:
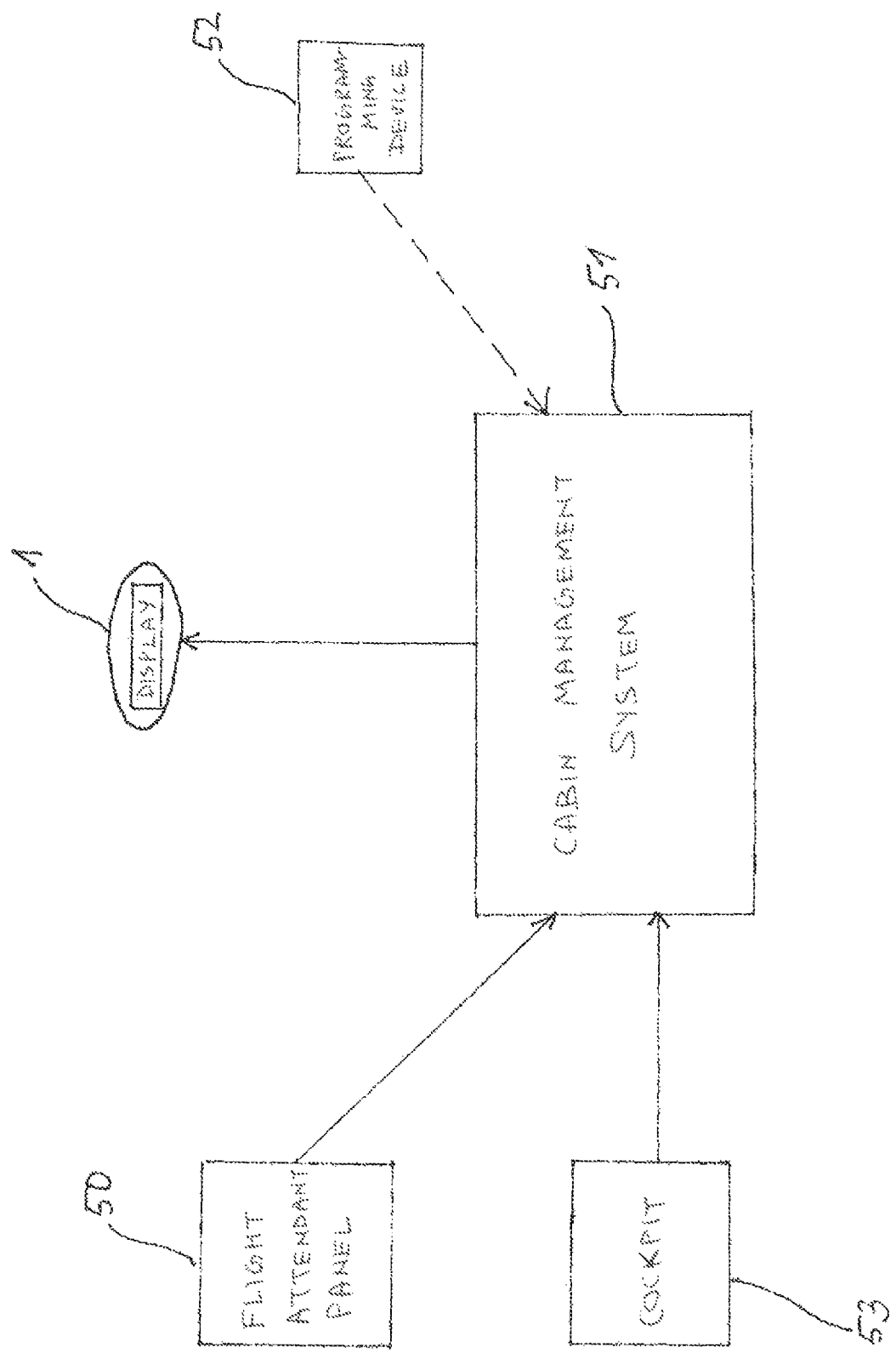
FIG. 12 shows an aircraft information system with an exemplary embodiment of the display module according to the invention.

FIG. 12 shows an aircraft information system with an exemplary embodiment of the display module according to the invention. The aircraft information system comprises an FAP (Flight Attendant Panel) 50, a CMS (Cabin Management System) 51 and the display module 1 according to the invention. The FAP 50 is connected to the CMS 51 which in turn is connected to the display module 10. In this way, with the FAP 50, by means of various operating elements the flight attendants can manually carry out desired settings of the display module or adjust them to conditions during the flight. The CMS 51 ensures smooth technical implementation of the corresponding control instructions. The pilots, too, by way of various operating elements (e.g. a switch for the "Fasten seat belts" pictogram) in the cockpit 53 can manually carry out desired settings of the display module or change them to conditions during the flight, in that the CMS is connected to the cockpit 53. In this exemplary embodiment a programming device 52 is used for wireless uploading of contents to be displayed and of the necessary configuration data to the storage device 14 of the display module 1. It is also possible to use a databus (not shown) for uploading. Uploading takes place in the manner already described above with reference to FIGS. 2 and 3.

Figure 13:
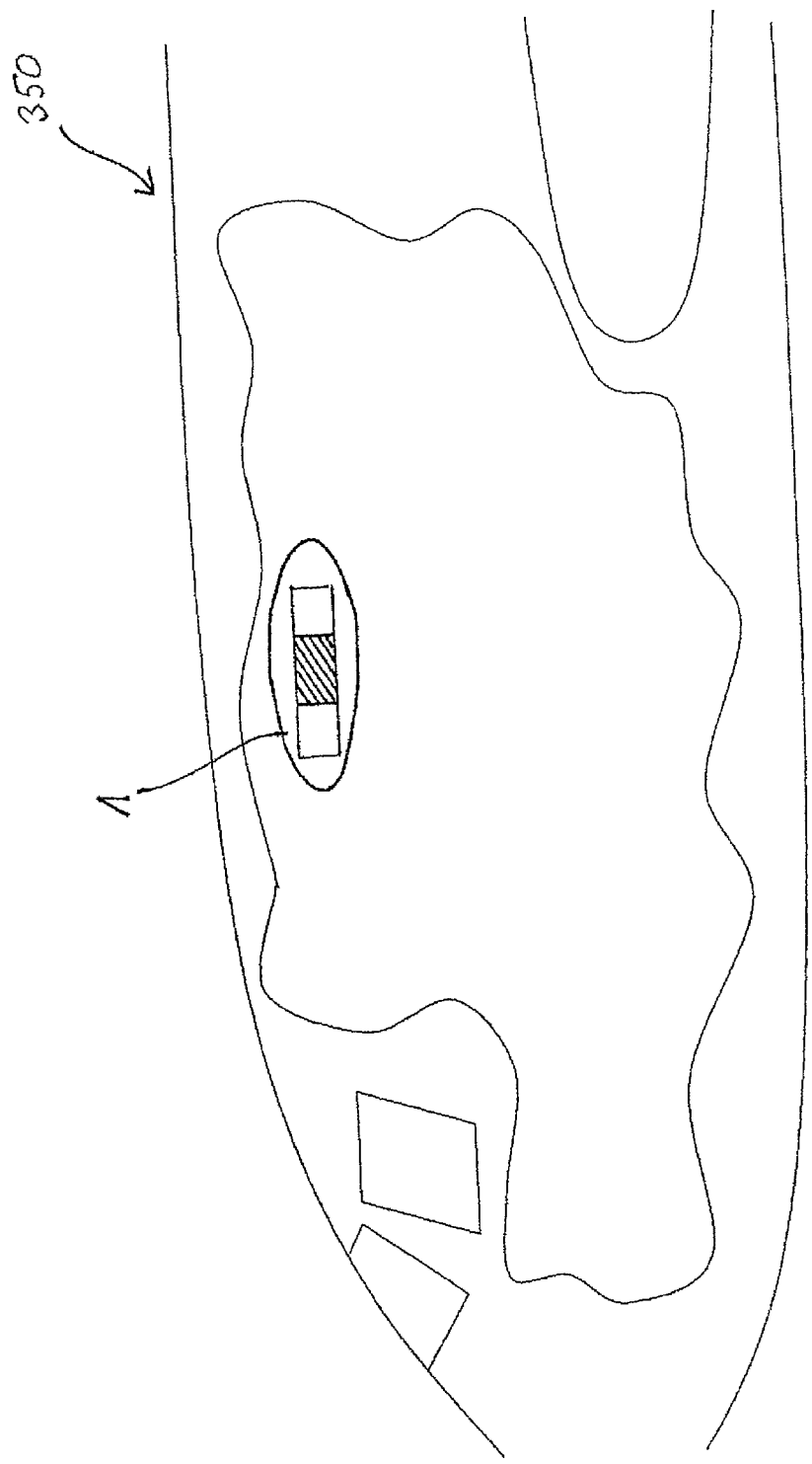
FIG. 13 shows an aircraft with an exemplary embodiment of the display module according to the invention.

FIG. 13 shows an aircraft 350 with an exemplary embodiment 1 of the display module according to the invention.

Although the invention was described with reference to a preferred exemplary embodiment, various alterations and modifications can be carried out without leaving the scope of protection of the invention. The invention can also be used in fields other than aviation, for example in trains, buses or ships, where display modules for displaying passenger-specific display information are also required or desirable.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A display module for displaying passenger-specific display information in an aircraft, comprising:
   a display,
   a control unit,
   a storage device for storing a plurality of contents and a plurality of display layouts, and
   a first interface,
   wherein the first interface is connected to the control unit, and wherein the control unit is configured, on the basis of a signal present at the first interface, to read out a first content of the plurality of contents and a display layout of the plurality of display layouts stored in the storage device and associated with the signal in relation to display information during runtime of the display module, and on the basis of the read-out first content and display layout and of the signal present at the first interface, to control the display,
   wherein the control unit is configured to control the display with regard to at least one of presentation position or presentation size of the display information for scaling or placing the display information in accordance with the read out display layout in the display,
   wherein the first interface is configured to receive a voltage supply for the display module via a first voltage supply line and to receive a pulsed voltage signal via a second voltage supply line, and
   wherein the control unit is configured to read out the first content and the display layout on the basis of the pulsed voltage signal.

2. The display module of claim 1, further comprising a second interface configured to couple a voltage supply to the display module.

3. The display module of claim 1, wherein the first interface is configured to couple a voltage supply to the display module.

4. The display module of claim 2, wherein the first interface is configured to couple a voltage supply to the display module, and the second interface is connected to the control unit, wherein the control unit is configured, on the basis of a signal present at the second interface, to read out a second content with regard to display information, and on the basis of the read-out second content and of the signal present at the second interface, to control the display.

5. The display module of claim 1, further comprising a cover member configured as a device providing at least one of mechanical protection for the display, mechanical adaptation to the surroundings, or an anti-glare device against scattered light.

6. The display module of claim 1, wherein the control unit, the storage device and the first interface are integrated in a controller board.

7. The display module of claim 1, wherein the first interface is a wireless interface.

8. The display module of claim 1, wherein the display information is selected from the group consisting of image elements, video sequences, text and formatting.

9. The display module of claim 8, wherein the control unit is configured to control the display on the basis of display information comprising text and corresponding text formatting.

10. The display module of claim 1, wherein the control unit is configured to read the first content out by way of the first interface.

11. The display module of claim 1, further comprising a clock module,
wherein the control unit is configured, on the basis of a signal present at one of the first interface, to read out the clock module, and on the basis of the read-out clock module and of the signal present at the first interface, to control the display.

12. The display module of claim 1, further comprising a display module test device, wherein the display module test device is configured to cause a data exchange for test purposes.

13. A method for displaying passenger-specific display information in an aircraft, comprising:
applying a first voltage signal and a second voltage signal to an interface of a display module, wherein the second voltage signal is a pulsed voltage signal;
reading out a first content with regard to display information of the display module on the basis of the second pulsed voltage signal applied to the interface;
reading out a display layout on the basis of the second pulsed voltage signal applied to the interface; and
controlling a display on the basis of the read-out first content, of the display layout, and of the signal applied to the interface,
wherein controlling comprises scaling or placing the display information in the display with regard to at least one of presentation position or presentation size of the display information in accordance with the display layout.

* * * * *